United States Patent
Kulshreshtha et al.

(10) Patent No.: US 9,552,552 B1
(45) Date of Patent: Jan. 24, 2017

(54) IDENTIFICATION OF OVER-CLUSTERED MAP FEATURES

(71) Applicant: Google Inc., Mountain View, CA (US)

(72) Inventors: Ashutosh Kulshreshtha, Sunnyvale, CA (US); Nicu D. Cornea, Santa Clara, CA (US); Luca de Alfaro, Mountain View, CA (US)

(73) Assignee: Google Inc., Mountain View, CA (US)

( * ) Notice: Subject to any disclaimer, the term of this patent is extended or adjusted under 35 U.S.C. 154(b) by 649 days.

(21) Appl. No.: 13/970,595

(22) Filed: Aug. 20, 2013

Related U.S. Application Data

(63) Continuation of application No. 13/098,346, filed on Apr. 29, 2011, now Pat. No. 8,533,146.

(51) Int. Cl.
*G06N 7/00* (2006.01)
*G06N 5/04* (2006.01)

(52) U.S. Cl.
CPC ............... *G06N 5/048* (2013.01); *G06N 7/00* (2013.01)

(58) Field of Classification Search
None
See application file for complete search history.

(56) References Cited

U.S. PATENT DOCUMENTS

| | | | |
|---|---|---|---|
| 6,456,622 B1 | 9/2002 | Skaanning et al. | |
| 6,631,362 B1 | 10/2003 | Ullman et al. | |
| 7,117,199 B2 | 10/2006 | Frank et al. | |
| 7,130,777 B2 | 10/2006 | Garg et al. | |
| 7,263,506 B2 | 8/2007 | Lee et al. | |
| 7,440,875 B2 | 10/2008 | Cuthbert et al. | |
| 7,519,562 B1 | 4/2009 | Vander Mey et al. | |
| 7,525,484 B2 | 4/2009 | Dupray et al. | |
| 7,764,231 B1 | 7/2010 | Karr et al. | |
| 7,788,030 B2 | 8/2010 | Kato et al. | |
| 7,822,631 B1 | 10/2010 | Vander Mey et al. | |
| 8,015,183 B2 | 9/2011 | Frank | |
| 8,019,641 B2 | 9/2011 | Foroutan | |
| 8,103,445 B2 | 1/2012 | Smith et al. | |
| 8,112,802 B2 | 2/2012 | Hadjieleftheriou et al. | |
| 8,185,448 B2 | 5/2012 | Myslinski | |
| 8,190,546 B2 | 5/2012 | Dong et al. | |
| 8,229,795 B1 | 7/2012 | Myslinski | |
| 8,321,295 B1 | 11/2012 | Myslinski | |
| 8,370,340 B1 | 2/2013 | Yu et al. | |
| 8,396,840 B1 | 3/2013 | McHugh et al. | |

(Continued)

FOREIGN PATENT DOCUMENTS

WO    WO 2011/127659 A1    10/2011

OTHER PUBLICATIONS

Behnamfar, et al., MAP Decoding for Multi-Antenna Systems with Non-Uniform Sources: Exact Pairwise Error Probability and Applications, IEEE Transactions on Communications, vol. 57, No. 1, 2009, pp. 242-254.*

(Continued)

*Primary Examiner* — Wilbert L Starks

(74) *Attorney, Agent, or Firm* — Dority & Manning, P.A.

(57) ABSTRACT

A system and method for managing online map information determines map records that represent more than one map feature by identifying map feature records where at least one attribute of the map feature record has more than value wherein each of the values has a probability of being correct that exceeds a threshold.

20 Claims, 7 Drawing Sheets

(56) References Cited

U.S. PATENT DOCUMENTS

| | | |
|---|---|---|
| 8,533,146 B1 | 9/2013 | Kulshreshtha et al. |
| 2002/0156917 A1 | 10/2002 | Nye |
| 2003/0046098 A1 | 3/2003 | Kim |
| 2003/0195793 A1 | 10/2003 | Jain et al. |
| 2003/0200543 A1 | 10/2003 | Burns |
| 2003/0225652 A1 | 12/2003 | Minow et al. |
| 2006/0106535 A1 | 5/2006 | Duncan et al. |
| 2006/0155501 A1 | 7/2006 | Hempel |
| 2006/0212931 A1 | 9/2006 | Shull et al. |
| 2006/0253584 A1 | 11/2006 | Dixon et al. |
| 2007/0072585 A1 | 3/2007 | Johnson et al. |
| 2007/0121596 A1 | 5/2007 | Kurapati et al. |
| 2007/0210937 A9 | 9/2007 | Smith et al. |
| 2007/0273558 A1 | 11/2007 | Smith et al. |
| 2008/0010262 A1 | 1/2008 | Frank |
| 2008/0010273 A1 | 1/2008 | Frank |
| 2008/0010605 A1 | 1/2008 | Frank |
| 2008/0026360 A1 | 1/2008 | Hull |
| 2008/0046334 A1 | 2/2008 | Lee et al. |
| 2008/0104180 A1 | 5/2008 | Gabe |
| 2008/0208849 A1 | 8/2008 | Conwell |
| 2009/0024589 A1 | 1/2009 | Sood et al. |
| 2009/0043786 A1 | 2/2009 | Schmidt et al. |
| 2009/0157667 A1 | 6/2009 | Brougher et al. |
| 2009/0182780 A1 | 7/2009 | Wong et al. |
| 2009/0257621 A1 | 10/2009 | Silver |
| 2009/0265198 A1 | 10/2009 | Lester et al. |
| 2010/0017348 A1 | 1/2010 | Pinckney et al. |
| 2010/0030578 A1 | 2/2010 | Siddique et al. |
| 2010/0070930 A1 | 3/2010 | Thibault |
| 2010/0131499 A1 | 5/2010 | Van Leuken et al. |
| 2010/0153324 A1 | 6/2010 | Downs et al. |
| 2010/0153451 A1 | 6/2010 | Delia et al. |
| 2010/0325179 A1 | 12/2010 | Tranter |
| 2010/0332119 A1 | 12/2010 | Geelen et al. |
| 2011/0040691 A1 | 2/2011 | Martinez et al. |
| 2011/0072034 A1 | 3/2011 | Sly et al. |
| 2011/0122153 A1 | 5/2011 | Okamura et al. |
| 2011/0131172 A1 | 6/2011 | Herzog et al. |
| 2011/0185401 A1 | 7/2011 | Bak et al. |
| 2011/0208702 A1 | 8/2011 | Minde et al. |
| 2011/0238735 A1 | 9/2011 | Gharpure et al. |
| 2012/0023057 A1 | 1/2012 | Winberry et al. |
| 2012/0046860 A1 | 2/2012 | Curtis et al. |
| 2012/0110006 A9 | 5/2012 | Lubarski et al. |
| 2012/0124057 A1 | 5/2012 | Daoud et al. |
| 2012/0137367 A1 | 5/2012 | Dupont et al. |
| 2012/0191357 A1 | 7/2012 | Qiu et al. |
| 2012/0197979 A1 | 8/2012 | Palm et al. |
| 2012/0278321 A1 | 11/2012 | Traub et al. |
| 2012/0317046 A1 | 12/2012 | Myslinski |
| 2012/0317593 A1 | 12/2012 | Myslinski |
| 2012/0323842 A1 | 12/2012 | Izhikevich et al. |
| 2012/0326984 A1 | 12/2012 | Ghassabian |
| 2013/0031574 A1 | 1/2013 | Myslinski |
| 2013/0110839 A1 | 5/2013 | Kirshenbaum |
| 2013/0110847 A1 | 5/2013 | Sahuguet et al. |
| 2013/0125211 A1 | 5/2013 | Cashman et al. |

OTHER PUBLICATIONS

Supplementary European Search Report for European Patent Application No. EP 12846162, Jun. 16, 2015, 7 Pages.

Webpage for "WikiTrust," 3 pages [online] [Archived on Webarchive.org on Feb. 5, 2011] [Retrieved on Oct. 3, 2011] Retrieved from the Internet <URL:http://web.archive.org/web/20110205055410/http://wikitrust.soe.ucsc.edu/>.

Webpage for "WikiTrust," 2 pages [online] [Archived on Webarchive.org on Mar. 31, 2010] [Retrieved on Oct. 3, 2011] Retrieved from the Internet <URL:http://web.archive.org/web/20100331092857/http://wikitrust.soe.ucsc.edu/>.

Webpage for "Epinions.com," 3 pages, [online] [Archived on Webarchive.org on Apr. 24, 2011] [Retrieved on Oct. 3, 2011] Retrieved from the Internet <URL:http://web.archive.org/web/20110424004308/http://www10.epinions.com/help/faq/?show=faq_wot>.

Webpage for "Epinions.com," 3 pages, [online] [Archived on Webarchive.org on Mar. 9, 2010] [Retrieved on Oct. 3, 2011] Retrieved from the Internet <URL:http://web.archive.org/web/20100309003256/http://www.epinions.com/help/faq/?show=faq_wot>.

Wikipedia, "PageRank," Last Modified Apr. 22, 2011, 12 pages, [online] [Archived on Webarchive.org on Apr. 23, 2011] [Retrieved on Oct. 3, 2011] Retrieved from the Internet <URL:http://web.archive.org/web/20110423062028/http://en.wikipedia.org/wiki/PageRank>.

Wikipedia, "PageRank," Last Modified Apr. 6, 2010, 12 pages, [online] [Archived on Webarchive.org on Apr. 8, 2010] [Retrieved on Oct. 3, 2011] Retrieved from the Internet <URL:http://web.archive.org/web/20100408225901/http://en.wikipedia.org/wiki/PageRank>.

Wikipedia, "Reputation system," Last Modified Mar. 18, 2010, 3 pages, [online] [Archived on Webarchive.org on Apr. 1, 2010] [Retrieved on Oct. 3, 2011] Retrieved from the Internet <URL:http://web.archive.org/web/20100401065812/http://en.wikipedia.org/wiki/Reputation_system>.

Marriott, A., "Scalable Geospatial Object Database Systems," 2006, pp. 1-22.

Shyu, C.-R., et al., "GeoIRIS: Geospatial Information Retrieval and Indexing System-Content Mining, Semantics Modeling, and Complex Queries," IEEE Trans Geosci Remote Sens., Apr. 2007, pp. 839-852, vol. 45, No. 4.

Dyer, J., et al., "Consensus decision making in human crowds," Animal Behaviour, 2008, pp. 461-470, vol. 75.

Welinder, P., et al., "Online crowdsourcing: Rating annotators and obtaining cost-effective labels," IEEE Computer Society Computer Vision and Pattern Recognition Workshops (CVPRW), Jun. 13-18, 2010, San Francisco, USA.

Adler, T., et al., "Reputation Systems for Open Collaboration," Commun. ACM., Aug. 2011, pp. 81-87, vol. 54, No. 8.

Gupta, S., et al., "A Framework for Secure Knowledge Management in Pervasive Computing," In Proceedings of the Workshop on Secure Knowledge Management, Nov. 3-4, 2008, Dallas, Texas, 7 Pages.

* cited by examiner

IDENTIFICATION OF OVER-CLUSTERED MAP FEATURES

PRIORITY CLAIM

The present application is a continuation of U.S. application Ser. No. 13/098,346 (U.S. Pat. No. 8,533,146) having a filing date of Apr. 29, 2011. Applicant claims priority to and benefit of such application and incorporate such application herein by reference.

FIELD

The present specification relates to identification of over-clustered map features.

BACKGROUND

Online information sources are now frequently updated and corrected by users of the information. All kinds of information on-line is editable by any user, such as business directories, maps, community pages, FAQs, and many other types of information. However that creates the problem of determining the accuracy of user-provided information. Users may be incorrect either on purpose or because the user is mistaken. For example, in the case of a phone number for a business, a user may wish to direct callers to a competing business and provide the competing business' phone number. Alternatively, the user may, as a prank, provide a completely unrelated phone number. Such intentionally incorrect information is unreliable and is also referred to as "spam."

Unreliable information is becoming more and more of a problem. Malicious users can intentionally mislead others using computer programs that repeatedly change the value of a map attribute to an unreliable value, even as other users correct the unreliable value.

In some approaches to assessing accuracy of user-provided information, expert reviewers assess the information. This however is laborious and time consuming. In extreme cases, it would require a reviewer to physically go somewhere to verify information. Under this approach, it may take days or weeks for incorrect or out-of-date information to be updated.

Errors from incorrect and outdated information lead to very frustrating experiences for users. For example, a user may obtain the phone number for a business from an on-line business directory. If that phone number is wrong, the user will not be able to contact the business. If the number is intentionally incorrect, for example the listed phone number is the phone number of a competing business, the user may even be mislead into contacting a business with whom they did not intend to do business.

SUMMARY OF THE INVENTION

In one embodiment, a system and method for updating information about features on maps provided by an online map hosting system allows users and other sources (referred to jointly as "users") to add map features and update or correct information about attributes of map features that appear on maps. Users propose edits from a client device such as a personal computer or a mobile client device such as a smartphone, PDA, laptop, or the like.

A correctness score for values of attributes of map features is used to identify records for map features that are a combination of more than one map feature ("over-clustered records"). In one embodiment, the correctness score is determined from a probability that a source provides unreliable information and other factors.

A map editing system comprises a network interface configured to receive proposed values for attributes of map features from client devices. The map editing system further comprises engines (equivalently, "modules") to determine the correctness score and identify over-clustered records for map features.

The features and advantages described in this summary and the following detailed description are not all-inclusive. Many additional features and advantages will be apparent to one of ordinary skill in the art in view of the drawings, specification, and claims hereof.

DETAILED DESCRIPTION

Introduction

An online map is one example of an online information source that makes information about specific facts available to user. An online map includes a plurality of map features, each of which has multiple attributes. A feature and its attributes correspond to a fact which is extrinsically verifiable. A map feature is anything that might appear on a map that would be of interest to those using a map. Map features include, but are not limited to, natural features such as bodies of water, mountains, forests, rivers, and so forth; man-made features, such as cities, addresses, streets, businesses, airports, train stations, stadiums, ports, buildings; and points of interest (POI) such as historic sites, and landmarks. Attributes of map features are characteristics of the map feature that identify, locate, or describe the feature, and include, for example, the latitude and longitude of the map feature, and the name of the feature. Additional attributes are appropriate depending on the type of map feature. Street address is an attribute of many types of map features. Attributes of map features that are businesses include phone numbers, reservations phone numbers, customer service phone numbers, fax numbers, website address, email address and opening times. Generally, attributes are any pieces of information about a map feature that are useful to users of maps, and can describe the physical, contextual, or semantic aspects of a map feature.

Edits to the map are additions and updates to the online map. Edits include the addition of a map feature not previously on the map and corrections and updates to attributes of map features that are present. Edits are received by a map editing server and come from a variety of sources. Databases of map features can be purchased by the online map provider. Information from such databases can be used to add map features not previously on the map or update the attributes of map features already part of the online map. Additionally, individual users can propose map features as well as propose updates to attributes of map features.

From the received proposed values and metadata from the user providing the proposed value, the system determines a number of scores: the probability that a proposed value is accurate, the probability that the user proposing the value provides accurate information, the probability that the user who provided the value provides unreliable information, and the probability that the proposed value is unreliable. Additionally, the system determines a consensus value for the attribute, automatically accepts and rejects proposed values based on a score indicating the probability that the value is correct and reviews map features to determine whether two map features that are actually two separate map features were improperly merged after a mistaken determination that the two map features were duplicates of eachother.

Architecture

Figure 1:
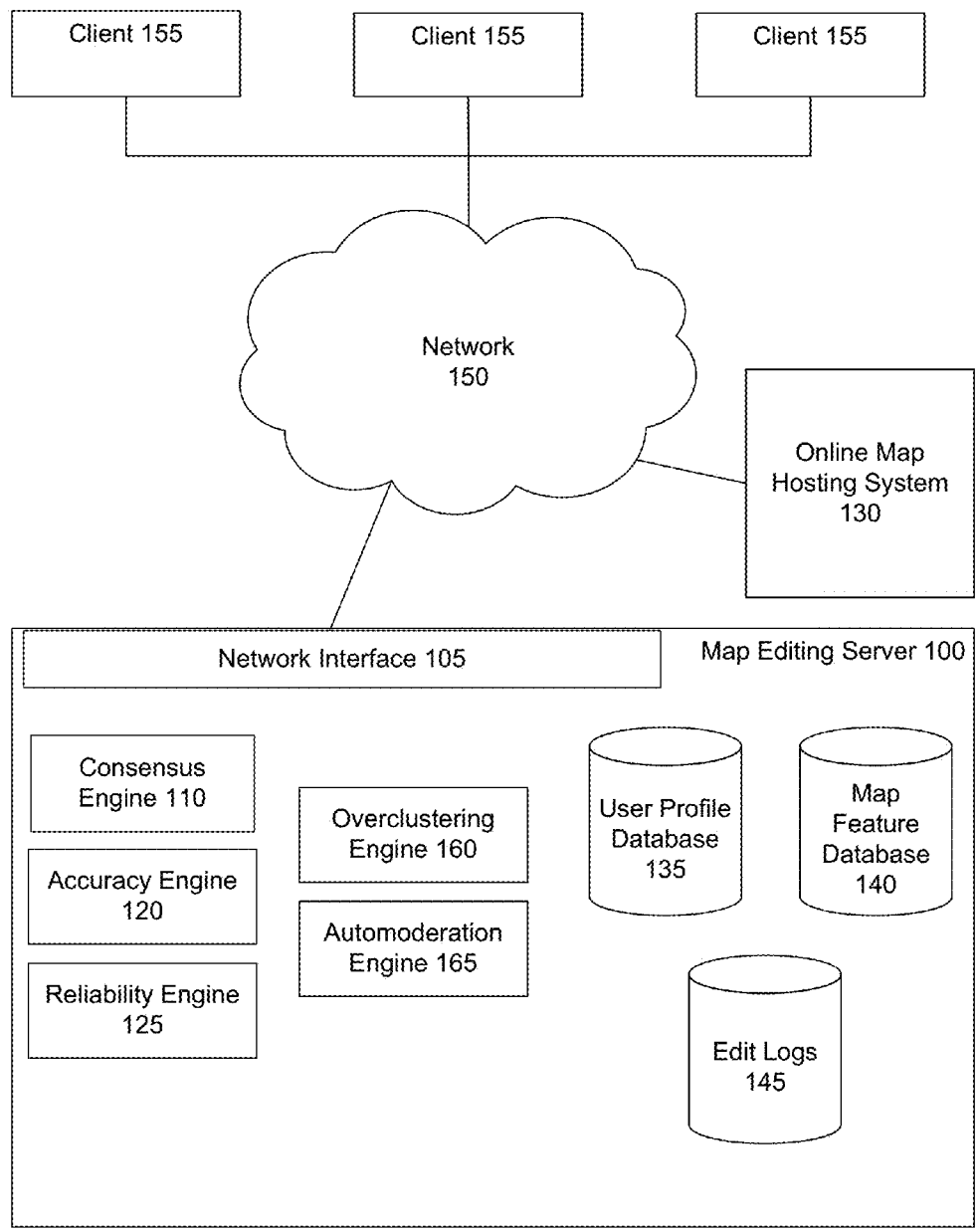
FIG. 1 is a diagram of a system architecture according to one embodiment.

FIG. 1 is a diagram of system architecture according to one embodiment. A map editing server 100 communicates with clients 155 and an online map hosting system 130 via a network interface 105 and a network 150.

The map editing server 100 comprises a consensus engine 110, an accuracy engine 120, a reliability engine 125, a user profile database 135, a map feature database 140, edit logs 145, an overclustering engine 160 and an automoderation engine 165. For simplicity, only one map editing server 100, consensus engine 110, accuracy engine 120, reliability engine 125, user profile database 135, map feature database 140, edit logs 145, overclustering engine 160 and automoderation engine 165 are shown but in practice many of each of these components may be in operation.

The map editing server 100 is implemented on one or more server-class computers comprising a CPU, memory, network interface, peripheral interfaces, and other well known components, and executing under the control of one or more server programs. The computers themselves preferably run an open-source operating system such as LINUX, have generally high performance CPUs, with 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible, non-transitory computer accessible storage mediums (e.g., RAM, hard disk, or optical/magnetic media), or by equivalent implementations in hardware and/or firmware.

The network 150 is typically the Internet, but may also be any network, including but not limited to a LAN, a MAN, a WAN, a mobile, wired or wireless network, telecommunication network, a private network, or a virtual private network, and any combination thereof.

The client 155 is any type of device that is adapted to access the map editing server 100 and online map hosting system 130 over the network 150 and that allows user to input information which the client 155 in turn transmits to the map editing server 100. Examples include, but are not limited to, personal computing devices including handheld and mobile devices. Users access online maps from the online map hosting system 130 (described below), and propose edits to the map via the client 155. The proposed edits are received at the map editing server 100 via the network interface 105. The map editing server 100 provides updated map data to the online map hosting system 130. For simplicity only three clients 155 are shown; in practice there will be numerous clients 155 communicating with map editing server 100.

The online map hosting system 130 is any web-based application known in the art that provides online maps and information about map features, such as business listings, to users. An exemplary online map hosting system 130 is GOOGLE™ Maps. Upon receiving updated map data from the map editing server 100, the online map hosting system 130 can incorporate the updated map data in maps provided by the online map hosting system 130.

Figure 2:
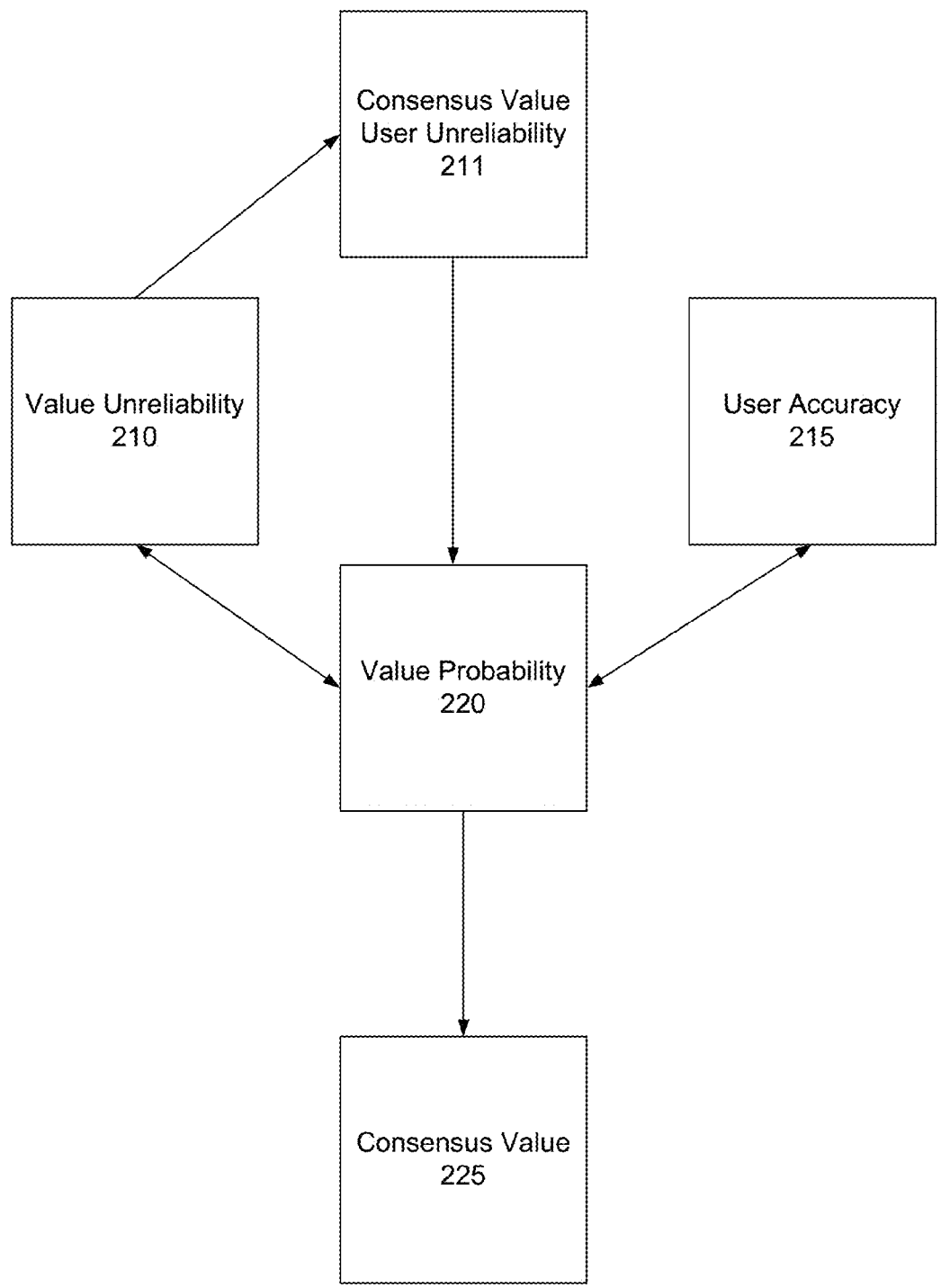
FIG. 2 illustrates the interrelation between the different computed values in determining the consensus value according to one embodiment.

The consensus engine 110, accuracy engine 120 and reliability engine 125 are part of the process of determining a consensus value for an attribute of a map feature. Referring to FIG. 2 in addition to FIG. 1, a description of these components and an overview of the values determined by the engines is provided. The determination of consensus values is an iterative process where the component scores are determined multiple times until each of the scores converges. Then the consensus value is determined. The determination of each score and the consensus value is described in greater detail after this overview. The accuracy engine 120 and reliability engine 125 each provide input to the consensus engine 110 which in turn determines the consensus value 225 for the attribute. The accuracy engine 120 determines a score ("user accuracy 215") indicative of how often the values proposed by a given user are accurate for the attribute for which they are proposed. A user has a high user accuracy score 215 when the values the user proposes have high probabilities of being the correct value.

The reliability engine 125 determines a score ("value unreliability 210") indicative of the probability a proposed value is unreliable, which is based on the value probability 220, and is one means for performing this function. The higher the value unreliability 210, the more likely the proposed value is unreliable, or spam. The value unreliability 210 takes into account all instances of a particular value being proposed regardless of the feature for which the value is being proposed. For example, the value unreliability 210 of the phone number 312-555-1212 is determined regardless of whether that phone number is being proposed for a pizza parlor, a library or a movie time information line.

Additionally, the reliability engine 125 determines a score indicative of the probability that each user having proposed a value provides unreliable information. The higher the user unreliability score, the more likely that the user is unreliable or a spammer. In one embodiment, the reliability engine 125 determines the probability that a user provides unreliable information according to one or more of three different models. A first model is based on the iterative model used to determine a consensus value for an attribute and is the consensus value user unreliability 211. The consensus value user unreliability 211 is optionally used by the consensus engine 110 in the determination of the value probability 220. The operation of the of reliability engine 125 using the first model is described in greater detail in reference to FIG. 3.

A second model is based on analysis of user's editing sessions and is the session-based user unreliability 411. The operation of the reliability engine 125 using the second model is described in greater detail in reference to FIG. 4.

A third model is based on analysis of characteristics of the values proposed by the user and is the content-based user unreliability 511. The operation of the reliability engine 125 using the third model is described in greater detail in reference to FIG. 5.

In one embodiment, the three scores, 211, 411 and 511 are combined into a comprehensive user unreliability score. In other embodiments the scores from only one or two of the models are used.

The consensus engine 110 determines the value probability 220 which is the probability that a given value is the correct value for the attribute for which it is proposed. The value probability 220 is based on the user accuracy 215 of the user proposing the value and optionally on the value unreliability 210 as well. The value probabilities 220 for the values proposed for an attribute are analyzed by the consensus engine 110 to determine the consensus value 225 for the attribute. The operation of each of these engines is discussed in further detail below.

The consensus value user unreliability 211, value unreliability 210, user accuracy 215, value probability 220, and consensus value 225 are determined regularly in an iterative process. As the iterative process proceeds until the determined scores individually stabilize or converge.

The automoderation engine 165 automatically accepts or rejects proposed values for attributes using scores determined by the accuracy engine 120, reliability engine 125 and consensus engine 110, and is one means for performing this function. The operation of the automoderation engine is described in greater detail below in reference to FIG. 6.

The overclustering engine 160 identifies map feature records which could be multiple map features mistakenly combined into a single record and flags these map feature records for additional review, and is one means for performing this function. The overclustering engine 160 uses edit correctness 605 for the attributes of map features as determined by the automoderation engine 165. The operation of the overclustering engine 160 is described in greater detail in reference to FIG. 7.

The user profile database 135 stores profiles for users of the map editing server 100 including for each user, a user ID, the user accuracy 215, user unreliability scores 211, 411 and 511 and reference(s) to the edits proposed by the user, and in the case of edits that are proposing values for attributes of map features, the value probability 220 for the proposed values stored in the map feature database 140.

The map feature database 140 stores the edits proposed by users. For those edits which are proposed values for attributes of map features, the value unreliability 210 and value probability 220 for the proposed values is stored as associated with the edit. The map feature database 140 additionally stores the overclustering score 713 for map features and the edit correctness 605.

The edit logs 145 contain information about user interactions with the map editing server 100. Each log entry includes timestamp information, the user's ID, the type of interaction and other metadata. In one embodiment, the edit logs 145 also include user interactions with the online map hosting system 130. Optionally, edit logs 145 include an IP address of the client device interacting with the map editing server 100.

Determining Consensus Values for Attributes of Map Features

Figure 3:
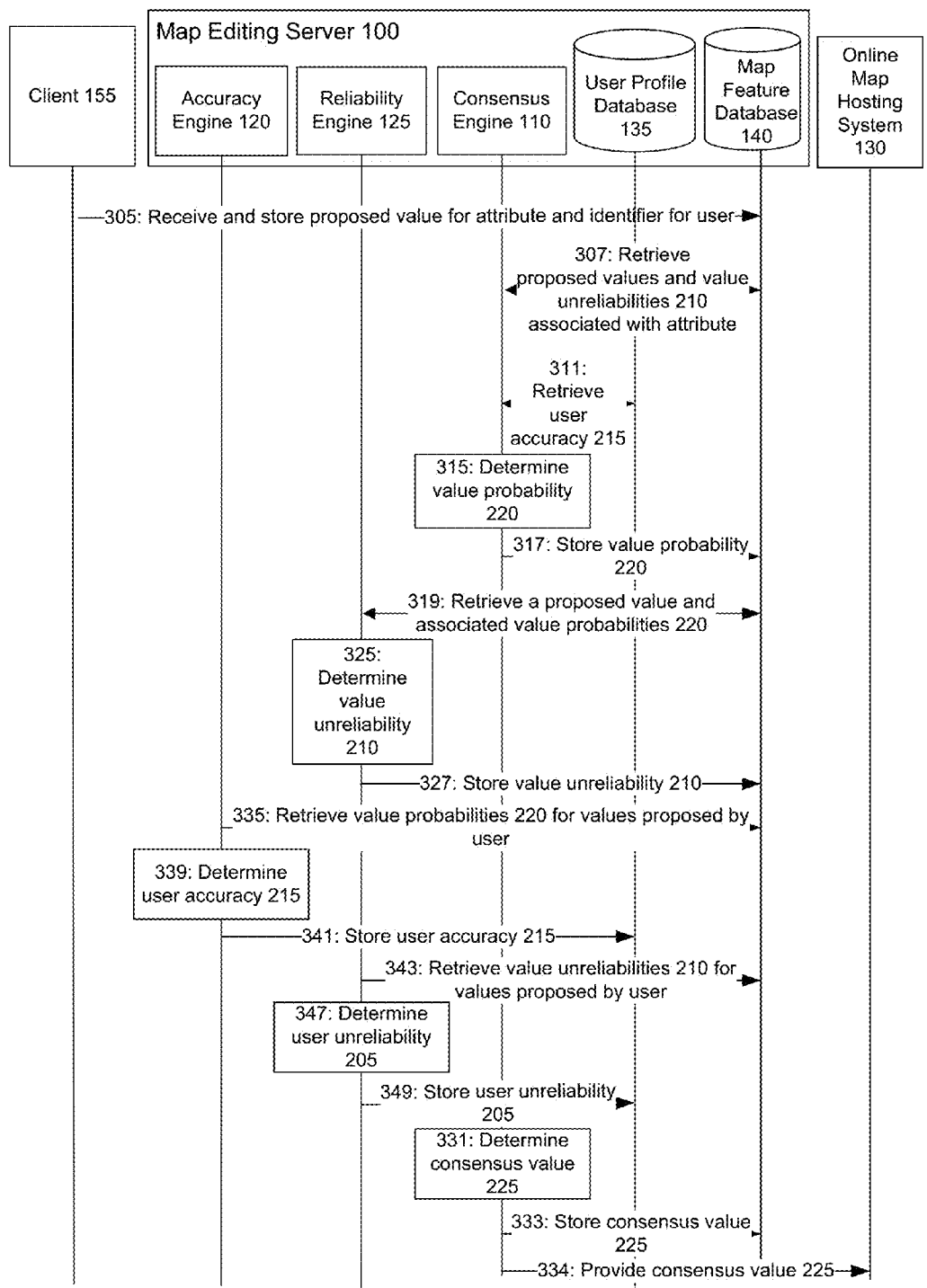
FIG. 3 is a data flow chart illustrating the process of determining the consensus value for an attribute of a feature according to one embodiment.

FIG. 3 illustrates an interaction diagram showing one embodiment of a process for determining the consensus value 225 for an attribute of a feature. Users input proposed values at their respective clients 155 which transmit them to the map editing server 100. The proposed values are received 305 by the map editing server 100 and stored in the map feature database 140. In one embodiment, a proposed value is in the form of the statement [u:e=x], user u proposes that attribute e has value x. The statement can also be represented as a 3-tuple: (u, e, x). The proposed value can be transmitted in the form of a message to the map editing server 100, for example passing the components u, e, and x as parameters via a web page or web service. More generally, the map editing server 100 exposes an application programming interface (API) by which users can input their proposed values, as well as make other requests.

The consensus engine 110 determines 315 the value probabilities 220 for the proposed values for an attribute. In order to determine 315 value probabilities 220 for the proposed values for an attribute, the consensus engine 110 retrieves 307 a subset of proposed values for the attribute as well as the value unreliability 210 for each from the map feature database 140. The consensus engine 110 also retrieves 311 the user accuracy 215 for the user providing each proposed value from the user profile database 135. These inputs are used to determine 315 the value probability 220.

Using a Bayesian model, value probability 220, s, for each proposed value x, is determined as follows:

$$s = Pr(g(e) = x \mid A(e)) = \frac{\bar{s}(x) \cdot \prod_{u \in U(e)} Pr([u:e=y] \mid q_u, x)}{\sum_{x'} \bar{s}(x') \cdot \prod_{u \in U(e)} Pr([u:e=y] \mid q_u, x')} \quad (1)$$

wherein:
$\bar{s}(x)$ is the a priori probability that x is the correct value
$q_u$ is the user accuracy 215. When a user is new to the system, $q_u$ is set to a default. As the user proposes more values for attributes, $q_u$ is adjusted based on actual information about values proposed by the user.
A(e) is the set of statements made for the attribute, e
U(e) is the set of all users who proposed values for e
X(e) is the set of all proposed values, x, for e
u(e) is the proposed value provided by a user for e
g(e) is the true state of e In embodiments where value unreliability 210, $z_x$, is taken into account, $\bar{s}(x)$ is substituted by $$\bar{s}(x) \propto \frac{1 - z_x}{n_e}$$

wherein $n_e$ is the total number of different values that have been proposed for e. The value probabilities 220 are then stored 317 in the map feature database 140.

In an alternative embodiment, value probability 220 is determined through a voting inference when the user accuracy 215, $q_u$, is used as a weight for the proposed value provided by the user. Each user is essentially voting on the proposed value provided by the user for an attribute with the user's own history. This embodiment accounts for the fact that the values proposed by users are not statistically independent. Using voting inference, the value probability 220 is determined as follows:

$$s = \frac{\sum_{u \in U(e) \mid u(e) = x} f(q_u)}{\sum_{u \in U(e)} f(q_u)} \quad (2)$$

wherein $f(q_u)$ is an amount of support the proposed value has which can be the identity function or alternatively, it may be a non-negative function representing the cost, for a user, of achieving accuracy q.

In yet another alternative, the Bayesian and voting approaches are combined giving the following determination of the value probability 220:

$$s = r(x) \cdot \frac{\sum_{u \in U(e) | u(e)=x} f(q_u)}{\sum_{u \in U(e)} f(q_u)} \quad (3)$$

wherein r(x) is an existence probability for each proposed value, x and is determined as follows:

$$r(x) = \frac{\alpha \cdot \bar{s}(x) \cdot \prod_{u \in U(e) | u(e)=x} (1 + f(q_u))}{1 + \alpha \cdot \bar{s}(x) \cdot \prod_{u \in U(e) | u(e)=x} (1 + f(q_u))} \quad (4)$$

and wherein α is an attenuation factor and has the value 0<α<1 and the value unreliability 210, $z_x$, is taken into account by substituting $\bar{s}(x)$ with $$\bar{s}(x) \propto \frac{1 - z_x}{n_e}.$$

To determine 325 the value unreliability 210, the reliability engine 125 retrieves 319 from the map feature database 140 the instances that a particular value is proposed for any attribute as well as the value probability 220 for each of those instances that the value was proposed. For example, assume that a user provides as proposed value for the phone number of a particular business the string "312-555-1212". All instances of "312-555-1212" being proposed as the phone number for any feature that has a phone number is requested as well as the value probability 220 for each instance of "312-555-1212" being proposed. The reliability engine 125 determines 325 the value unreliability 210 for the proposed value and stores 327 it in the map feature database 140.

In one embodiment, the reliability engine 125 determines 325 value unreliability 210, $z_x$, for a value, x, as follows:

$$z_x = Pr(\tau | s_1, \ldots, s_n) = \frac{Pr(\tau) \cdot \prod_{i=1}^{n} Pr(s_i | \tau)}{\sum_{\tau' \in T} Pr(\tau') \cdot \prod_{i=1}^{n} Pr(s_i | \tau')} \quad (5)$$

wherein s is the value probability 220, τ is the reliability type, T={$\tau_h, \tau_s$}, $\tau_h$ represents a reliable type value and $\tau_s$ represents an unreliable type value.

To determine 339 user accuracy 215, the accuracy engine 120 retrieves 335 the value probabilities 220 for proposed values provided by the user. The accuracy engine 120 then determines 339 the user accuracy 215. In one embodiment, the user accuracy 215 is the average of the value probabilities 220 for all of the proposed values provided by the user. Optionally, the accuracy engine 120 requests value probabilities 220 for only a subset of proposed values provided by a user. In such an embodiment, the accuracy engine 120 may only request value probabilities 220 for proposed values provided recently such as for example in the last month, six months or a year. In yet another alternative, the value probabilities 220 for values proposed by the user are weighted based on the elapsed time since the user proposed that value with value probabilities for more recent proposed values weighted more heavily.

In one embodiment, to determine user accuracy 215, the value probabilities 220 for proposed values provided by the user are recalculated without the data provided by that user. These value probabilities 220 are used in the determination of user accuracy 215. Removing the user's own data from the determination of value probabilities 220 for values the user has proposed removes a self-congratulatory effect where a user's own submissions could inflate the user's accuracy score. The user accuracy 215 is stored 341 in the user profile database 135.

To determine consensus value user unreliability 211, the reliability engine 125 retrieves 343 the value unreliabilities 210 for proposed values provided by the user. The reliability engine 125 then determines 347 the consensus value user unreliability 211. The user unreliability is determined using Equation 5 with τ is the reliability type, T={$\tau_h, \tau_s$}, $\tau_h$ represents a reliable type user and $\tau_s$ represents an unreliable type user The consensus value user unreliability 211 is stored 349 in the user profile database 135.

The determined value probabilities 220 are used for a probability distribution over the subset of proposed values, x, which in turn is used to determine the consensus value 225. The consensus value 225 is the value whose value probability 220 is at the top of the peak of the distribution. Consensus value 225 is determined after the value probability and its inputs, user accuracy and optionally, value unreliability and user unreliability, have been iterated multiple times and those values are converging.

The value probabilities 220 are used for a probability distribution over the subset of proposed values which in turn is used to determine 331 the consensus value 225. The consensus engine 110 stores 333 the determined consensus value 225 in the map feature database 140 as the value for the attribute for which it was proposed and optionally provides 334 the consensus value 225 to the online map hosting system 130. The online map hosting system 130 then displays the consensus value 225 as the value for the attribute on maps provided to users.

Example 1

Table 1 shows a dataset of phone numbers proposed for three features: Pizza House, Hair Salon and Flower Shop by 5 users, A, B, C, D and E. A has proposed the same phone number for all three features. A is probably a spammer and thus an unreliable user and the value 312-555-1212 is likely an unreliable value. Of the other four proposed values for the phone number for Pizza House, three are the same and one is off by one digit from the three that are the same. It is likely that user E just made a mistake or a typo when proposing the phone number for Pizza House rather than purposely proposing the wrong phone number. The disclosed methods make these determinations automatically. The example shows the method through multiple iterations.

TABLE 1

Statements of Users

| Feature | Attribute Value | Users |
|---|---|---|
| Flower Shop | 312-555-1212 | A |
| Flower Shop | 312-256-3636 | D, E |
| Hair Salon | 312-555-1212 | A |
| Pizza House | 312-555-1212 | A |

TABLE 1-continued

Statements of Users

| Feature | Attribute Value | Users |
|---|---|---|
| Pizza House | 312-749-9992 | B, C, D |
| Pizza House | 312-749-9996 | E |

In this example no information is yet known about these users and an a priori user accuracy is set. The a priori user accuracy is programmed and in this example is set to 0.7. The value probabilities 220 are determined using the a priori user accuracy 215 and are shown in Table. 2.

TABLE 2

First Iteration Value Probabilities

| Feature | Attribute Value | Value probability |
|---|---|---|
| Flower Shop | 312-555-1212 | 0.1500 |
| Flower Shop | 312-256-3636 | 0.8500 |
| Hair Salon | 312-555-1212 | 1.0000 |
| Pizza House | 312-555-1212 | 0.0152 |
| Pizza House | 312-749-9992 | 0.9697 |
| Pizza House | 312-749-9996 | 0.0152 |

The value probabilities are added back to the model to determine calculated user accuracies 215, shown in Table 3. In this embodiment, user accuracy 215 is capped at 0.9500. User A who is likely a spammer has a lower user accuracy. User E does as well.

TABLE 3

First Iteration User Accuracies

| User | User Accuracy |
|---|---|
| A | 0.0826 |
| B | 0.9500 |
| C | 0.9500 |
| D | 0.9098 |
| E | 0.4326 |

The calculated user accuracies 215 are added back into the model to determine the value unreliability 210 as shown in Table 4. The spam phone number 312-555-1212 has a high unreliability score. The two numbers that have high value probabilities 220 as correct numbers for Pizza House and Flower Shop, have a 0 score for value unreliability 210.

TABLE 4

First Iteration Value Unreliabilities

| Value | Value Unreliability |
|---|---|
| 312-256-3636 | 0.0000 |
| 312-749-9996 | 0.0020 |
| 312-749-9992 | 0.0000 |
| 312-555-1212 | 0.0446 |

Consensus value user unreliabilities 211 are determined and shown in Table 5. The highest score is for user A who proposed the same phone number for three different businesses.

TABLE 5

First Iteration User Unreliabilities

| User | User Unreliability |
|---|---|
| A | 0.0446 |
| B | 0.0000 |
| C | 0.0000 |
| D | 0.0000 |
| E | 0.0010 |

The system iterates the values a second time. Using user accuracies 215 determined in Table 3 the value probability 220 is determined again and the results are shown in Table 6.

TABLE 6

Second Iteration Value Probabilities

| Feature | Attribute Value | Value probability |
|---|---|---|
| Flower Shop | 312-555-1212 | 0.0206 |
| Flower Shop | 312-256-3636 | 0.9794 |
| Hair Salon | 312-555-1212 | 1.0000 |
| Pizza House | 312-555-1212 | 0.0000 |
| Pizza House | 312-749-9992 | 1.0000 |
| Pizza House | 312-749-9996 | 0.0000 |

The second iteration of value probabilities 220 are added back in to system for determining a second iteration of user accuracies shown in Table 7. The user accuracy 215 for user A, the spammer, is decreasing.

TABLE 7

Second Iteration User Accuracies

| User | User Accuracy |
|---|---|
| A | 0.0103 |
| B | 0.9500 |
| C | 0.9500 |
| D | 0.9500 |
| E | 0.4897 |

Using the second iteration user accuracies 215, second iteration value unreliabilities 210 are determined and are shown in Table 8. The two numbers that were provided only for the businesses for which they are the phone number 312-256-3636 for Flower Shop and 312-749-9992 for Pizza House still have a 0 score indicating that they are reliable as opposed to unreliable. The value unreliability 210 for 312-555-1212, the spam number, has risen.

TABLE 8

Second Iteration Value Unreliabilities

| Value | Spam Probability |
|---|---|
| 312-256-3636 | 0.0000 |
| 312-749-9996 | 0.0026 |
| 312-749-9992 | 0.0000 |
| 312-555-1212 | 0.1567 |

Using second iteration values, the consensus value user unreliabilities 211 are determined again. The spammer, User A, has the highest consensus value user unreliability 211 score.

TABLE 9

Second Iteration User Unreliabilities

| User | User Unreliability |
|---|---|
| A | 0.1567 |
| B | 0.0000 |
| C | 0.0000 |
| D | 0.0000 |
| E | 0.0013 |

Consensus values 225 after this second iteration are 312-256-3636 as the phone number for Flower Shop; 312-555-1212 for Hair Salon and 312-749-9992 for Pizza House.

Example 2

In an alternative embodiment, the system determines a consensus value 225 without assessing value unreliability 210 and consensus value user unreliability 211. The process proceeds at first as in Example 1.

TABLE 10

Statements of Users

| Feature | Attribute Value | Users |
|---|---|---|
| Flower Shop | 312-555-1212 | A |
| Flower Shop | 312-256-3636 | D, E |
| Hair Salon | 312-555-1212 | A |
| Pizza House | 312-555-1212 | A |
| Pizza House | 312-749-9992 | B, C, D |
| Pizza House | 312-749-9996 | E |

An a priori user accuracy is used again and set to 0.7. The value probabilities are determined using the a priori user accuracy and are shown in Table. 11. These are the same as in Example 1 because the value unreliability 210 has not entered the calculation yet.

TABLE 11

First Iteration Value Probabilities

| Feature | Attribute Value | Value probability |
|---|---|---|
| Flower Shop | 312-555-1212 | 0.1500 |
| Flower Shop | 312-256-3636 | 0.8500 |
| Hair Salon | 312-555-1212 | 1.0000 |
| Pizza House | 312-555-1212 | 0.0152 |
| Pizza House | 312-749-9992 | 0.9697 |
| Pizza House | 312-749-9996 | 0.0152 |

The value probabilities are added back to the model to determine calculated user accuracies, shown in Table 12. Because the value unreliability 210 has not entered the calculation yet, these values too are the same as in Example 1. Again, in this example user accuracy 215 is capped at 0.9500.

TABLE 12

First Iteration User Accuracies

| User | User Accuracy |
|---|---|
| A | 0.0826 |
| B | 0.9500 |
| C | 0.9500 |
| D | 0.9098 |
| E | 0.4326 |

The system iterates the values a second time. Using user accuracies 215 determined in Table 10 the value probability 220 is determined and the results are shown in Table 13.

TABLE 13

Second Iteration Value Probabilities

| Feature | Attribute Value | Value probability |
|---|---|---|
| Flower Shop | 312-555-1212 | 0.0216 |
| Flower Shop | 312-256-3636 | 0.9784 |
| Hair Salon | 312-555-1212 | 1.0000 |
| Pizza House | 312-555-1212 | 0.0000 |
| Pizza House | 312-749-9992 | 1.0000 |
| Pizza House | 312-749-9996 | 0.0000 |

The second iteration of value probabilities 220 are added back in to system for determining a second iteration of user accuracies 215 shown in Table 14.

TABLE 14

Second Iteration User Accuracies

| User | User Accuracy |
|---|---|
| A | 0.0108 |
| B | 0.9500 |
| C | 0.9500 |
| D | 0.9500 |
| E | 0.9318 |

Consensus values 225 after this second iteration are 312-256-3636 as the phone number for Flower Shop; 312-555-1212 for Hair Salon and 312-749-9992 for Pizza House.

Determining Session-Based User Unreliability

Figure 4:
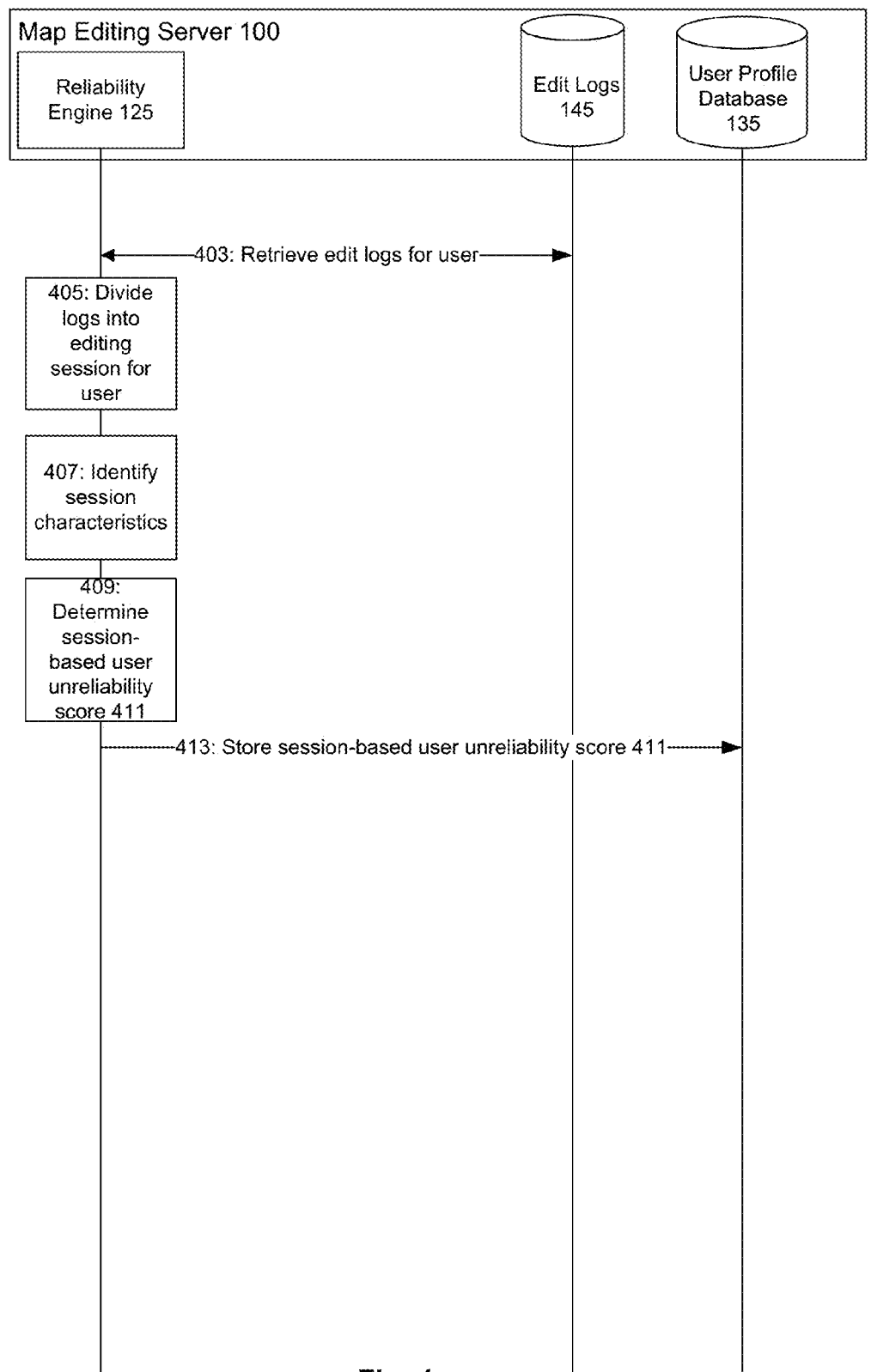
FIG. 4 is a data flow chart illustrating the determination of a session user unreliability score according to one embodiment.

FIG. 4 illustrates the process whereby the reliability engine 125 determines session-based user unreliability score 411. The session-based user unreliability score 411 is based on characteristics of editing sessions identified by analyzing edit sessions of unreliable users, or spammers. Unreliable users are identified through manual moderation of edits. The edit sessions of unreliable users are used as a training set for the reliability engine 125. The following characteristics of edit sessions are used for differentiating unreliable users from reliable users:

frequency of editing sessions—This can be determined per day, per week or per month. Unreliable users tend to be more regular in the frequency of editing sessions.

average time between editing sessions—This is measured in days, weeks or months. Unreliable users tend to edit more frequently.

mean frequency of editing sessions.

standard deviation of the frequency of editing sessions.

number of edits made per session—Unreliable users tend to make more edits per session than a reliable user.

amount of time to make an edit—In seconds or minutes. Unreliable users take very little time to make an edit.

time of day of the edit session—The day is divided into six four-hour blocks and the edit sessions are assigned to the four-hour block in which it occurred. For a user, each time of day receives a score that is a percentage of the user's edit sessions taking place during that four-hour block. Optionally, each edit is assigned to a block of time and the score is the percentage of individual edits taking place during that four-hour block.

whether the edit session is a weekday or a weekend day—This is a binary score with for example, 0 for weekend editing and 1 for weekday editing.

whether the edit session occurred in the evening or during the day—This is a binary score with for example, 0 for evening editing and 1 for daytime editing.

The reliability engine 125 retrieves 403 edit logs for a user from the edit logs 145. A user's edits for a given period of time, such as the last day, week, month or multiple months, are retrieved. These edits are divided 405 into editing sessions approximating the periods of time during which the user was making edits. A single session may be determined by a user logging into and out of the map editing server 100. In one embodiment, if a user does not log out manually, the user is deemed to have logged out after some period of non-activity. Alternatively, sessions are determined heuristically, based on the IP addresses and timestamps associated with each edit. By way of example, a session can be fixed in length (e.g., all edits from an IP address within a 30 minute interval from a first edit), or variable (all edits from an IP address, so long as each edit is within X minutes (e.g., 15 minutes) of the previous edit). In one embodiment, interactions with the online map hosting system 130 are also considered when determining edit sessions. For example an interaction with the online map hosting system 130 within X minutes of an edit is a continuation of the session.

Optionally, binary variables may be combined. For example if a session occurs during the day of a weekday, it has a combined score of 2 that goes into the model rather than two scores of 1 each.

The reliability engine 125 analyzes the determined edit sessions to identify 407 for the user for edit session characteristics, and is one means for performing this function. A score is determined for each characteristic and entered into the model to determine 409 the session-based user unreliability 411. In one embodiment, the model generated from the machine learning is a linear regression with multipliers for each measured characteristic. The equation is $z_s = c_s + \Sigma_{i=1}^{N} c_i v_i$ wherein $v_i$ is the score for each variable, $c_i$ is its multiplier and $c_s$ is the intercept generated from the model. The session-based user unreliability score 411 is $z_s$ normalized on a scale of 0 to 1 with a score closer to 1 indicating a higher probability that the user is unreliable. For example, session-based user unreliability score=$\exp(z_s)/(1+\exp(z_s))$.

The session-based user unreliability score 411 is stored 413 in the user profile database 135 as associated with the user.

Optionally other actions taken by a user during the edit session are also identified and entered into the model to determine session-based user unreliability 411. Identified actions, or supportive actions, include a user performing a search at a search engine zooming in on a map displayed to the user while the user is making an edit and switching between map and satellite views of a map displayed to the user. Supportive actions are indicative of a reliable user as these are actions a user might take to confirm the information the user is about to provide as an edit. A user intending to spam the system is unlikely to search to make sure the phone number the user is about to propose is the correct phone number or zoom in on a satellite view of the area in which the user is adding a map feature to make sure the position for its location is just right. Supportive actions would be quantified for use in the model as the average number of supportive actions per session, ratio of supportive actions to edits in an edit session, ratio of edit sessions having at least one supportive action and/or ratio of edits that are followed by a supportive action.

Determining Content-Based User Unreliability

Figure 5:
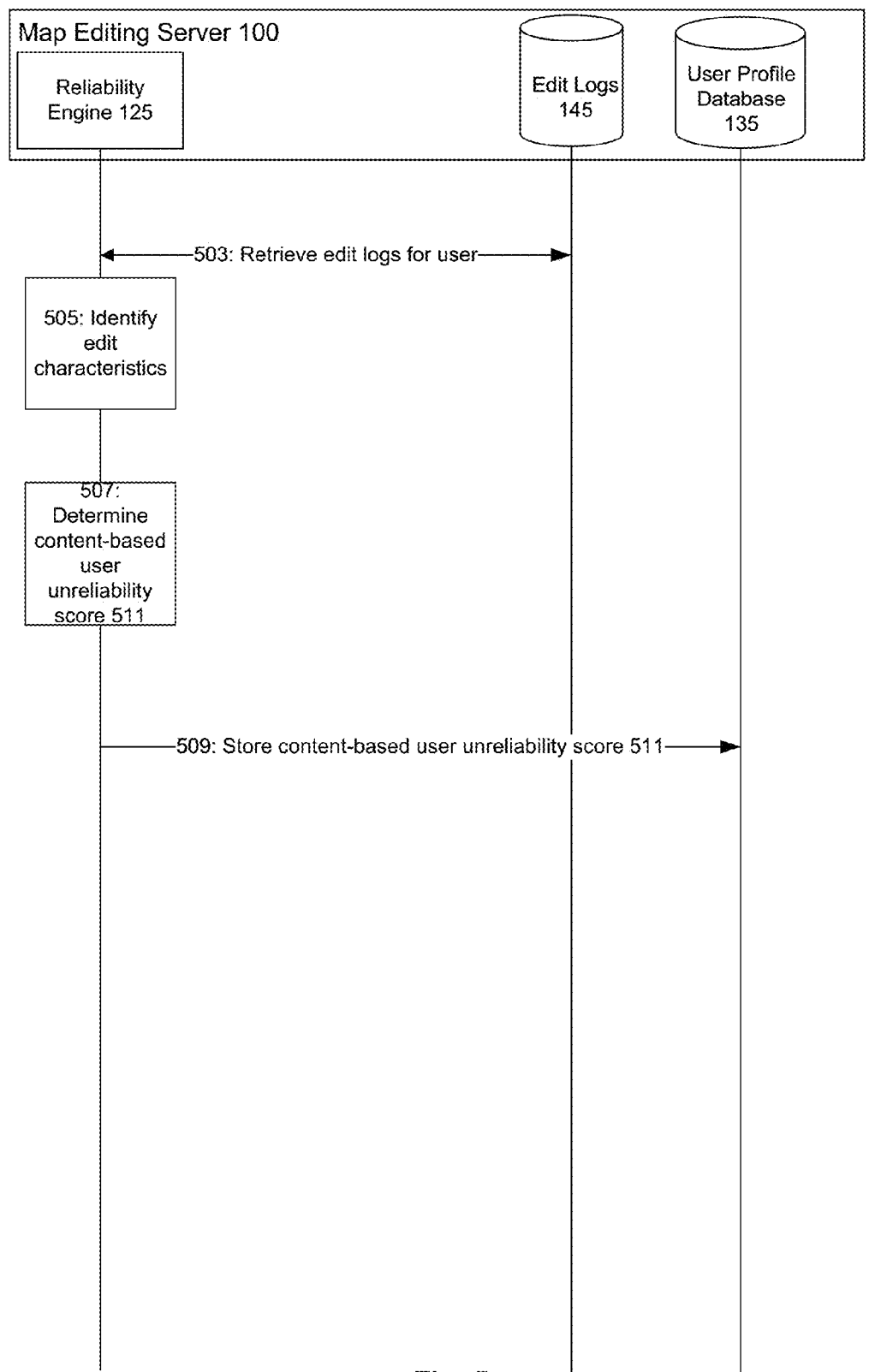
FIG. 5 is a data flow chart illustrating the determination of an edit user unreliability score according to one embodiment.

Referring to FIG. 5, the determination of the content-based user unreliability 511 is described. Content-based user unreliability 511 is determined by analyzing edits for weak signaling characteristics that are each individually are mildly suggestive of an unreliable user. One instance of such a signal among a user's edits is not necessarily dispositive. However, many instances of one of these weak signaling characteristics or many instances of more than one of the weak signaling characteristics can be combined to provide a strong predictive signal of the unreliability of the proposed value. These weak signaling characteristics can be identified by analyzing edit sessions of known unreliable users, or spammers. Manual moderation may also be used to identify unreliable users. The edit sessions of unreliable users are then used as a training set for the reliability engine 125.

In one embodiment, weak signaling characteristics include all capital letters for the name a map feature, the abbreviation "24 HR" (or an analog such as 24 HOUR or 24 hour) in the name of a map feature, the appearance of symbols in names (for example, "$ALE"), names that are very short or very long, the appearance of the name of a city in the name (for example, "San Jose Plumber"), an address that cannot be parsed, an insufficient address (only the city name for example), associations between the edited map feature and a large number of categories, the category names that include the word "cheap."

The reliability engine 125 retrieves 503 edits made by a user from the edit logs 145. A user's edits for a given period of time, such as the last day, week, month or multiple months, are retrieved. The reliability engine 125 analyzes the edits to identify 505 the weak signaling characteristics in the edits. In one embodiment, a count is kept incrementing by one for each instance of a weak signaling characteristic among edits of the user. The count for each of the weak signaling characteristics for the user is divided by the total number of edits retrieved and analyzed by the reliability engine 125 resulting in a score for each weak signal. Those scores are combined in a model, for example, a linear regression, with a multiplier for each weak signal score. An example equation is $z_c = c_c + \Sigma_{i=1}^{N} c_i v_i$ wherein $v_i$ is the score for each weak signal, $c_i$ is its multiplier and $c_c$ is the intercept generated from the model. The content-based user unreliability score 511 is determined 507 by normalizing $z_c$ on a scale of 0 to 1 with a score closer to 1 indicating a higher probability that the user is unreliable. For example, content-based user unreliability score is $\exp(z_c)/(1+\exp(z_c))$. The content-based user unreliability score is stored 509 in the user profile database 135 as associated with the user.

Auto-Moderation of Map Edits

Figure 6:
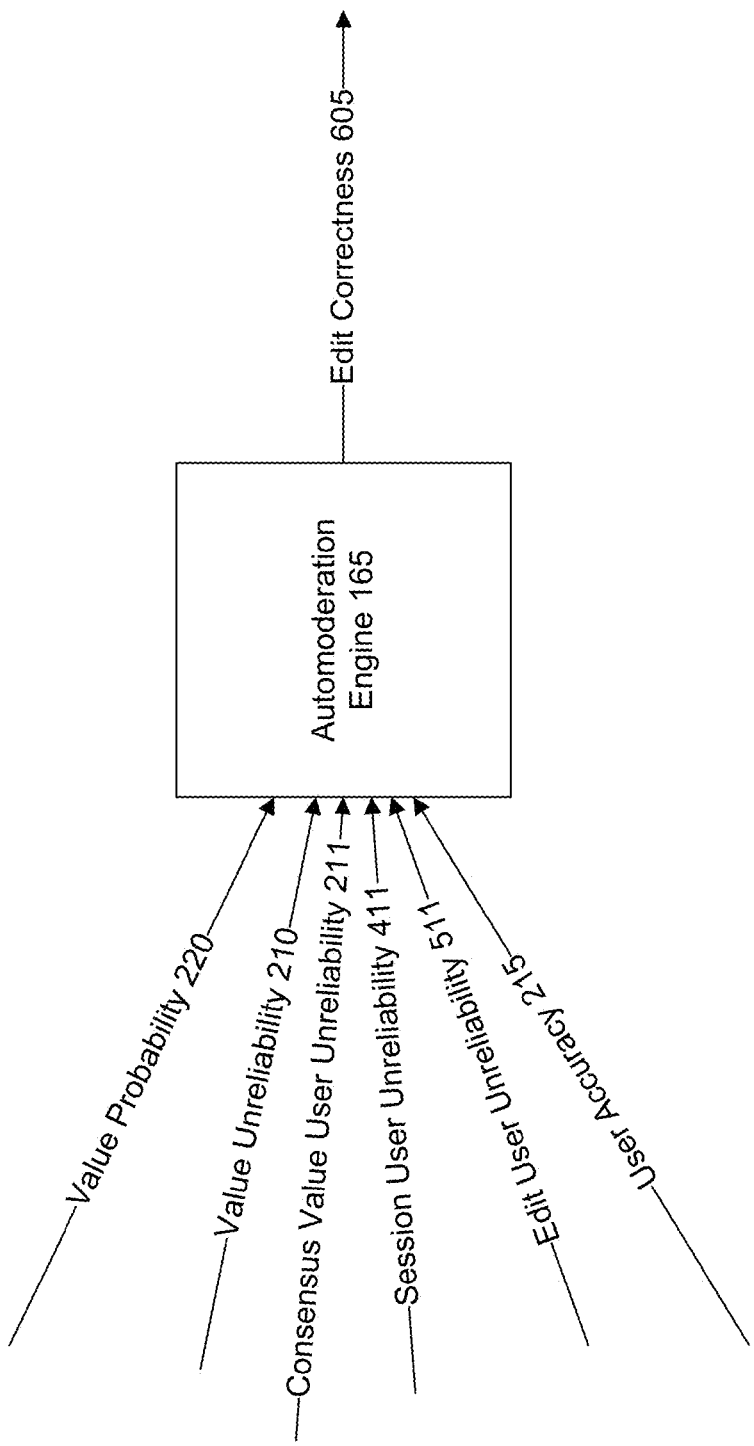
FIG. 6 illustrates the determination of the value correctness according to one embodiment.

Referring to FIG. 6, the operation of the automoderation engine is described. The automoderation engine 165 rejects or accepts edits proposed by users based on the scores 211, 411 and 511 determined for the unreliability of the user proposing the edit, value probability 220, the value unreliability 210, and the user accuracy 215. Alternatively fewer than all of these scores are used by the automoderation engine 165. The automoderation engine 165 determines the edit correctness 605 from the input scores. The model for the determination of the edit correctness 605 is determined through a machine learning classifiers in combination with training data of edits which were manually accepted or rejected. In one embodiment, the model is a linear regression and the equation is $z_{cor} = c_{cor} + \Sigma_{i=1}^{N} c_i v_i$ wherein $v_i$ is the score for each weak signal, $c_i$ is its multiplier and $c_c$, is the intercept generated from the model. The edit correctness is $z_{cor}$ normalized on a scale of 0 to 1 with a score closer to 1 indicating a higher probability that the edit is correct. For example, edit correctness 605 is $\exp(z_{cor})/(1+\exp(z_{cor}))$.

If the edit correctness 605 exceeds a threshold, for example 0.7 or 0.8, the edit is accepted. In one embodiment, the threshold required for accepting an edit differs depending on the prominence, or popularity, of the map feature being edited. The prominence of a map feature is how many impressions it has. An impression occurs when the map feature is displayed to a user on a map or in a list of map feature search results. In one embodiment, edits to map features of high prominence require an edit correctness >0.9 whereas edits to map feature of low prominence require only an edit correctness >0.5.

In one embodiment, all edits to a single map feature made by a single user are considered together as one edit. For example, if a user changes the telephone number and title of a map feature, the automoderation engine can treat that as one edit and accept or reject both. In such an embodiment, the edit correctness 605 is determined for each edit. The two edit correctness 605 are then combined (for example as an average) and the acceptance or rejection is determined based on that combined edit correctness 605.

The edit correctness 605 is stored as associated with the edit in the map feature database 140. Those edits that are accepted are optionally provided to the online map hosting system 130 and appear on maps provided to users of the online map hosting system 130.

Overclustering Detection

Figure 7:
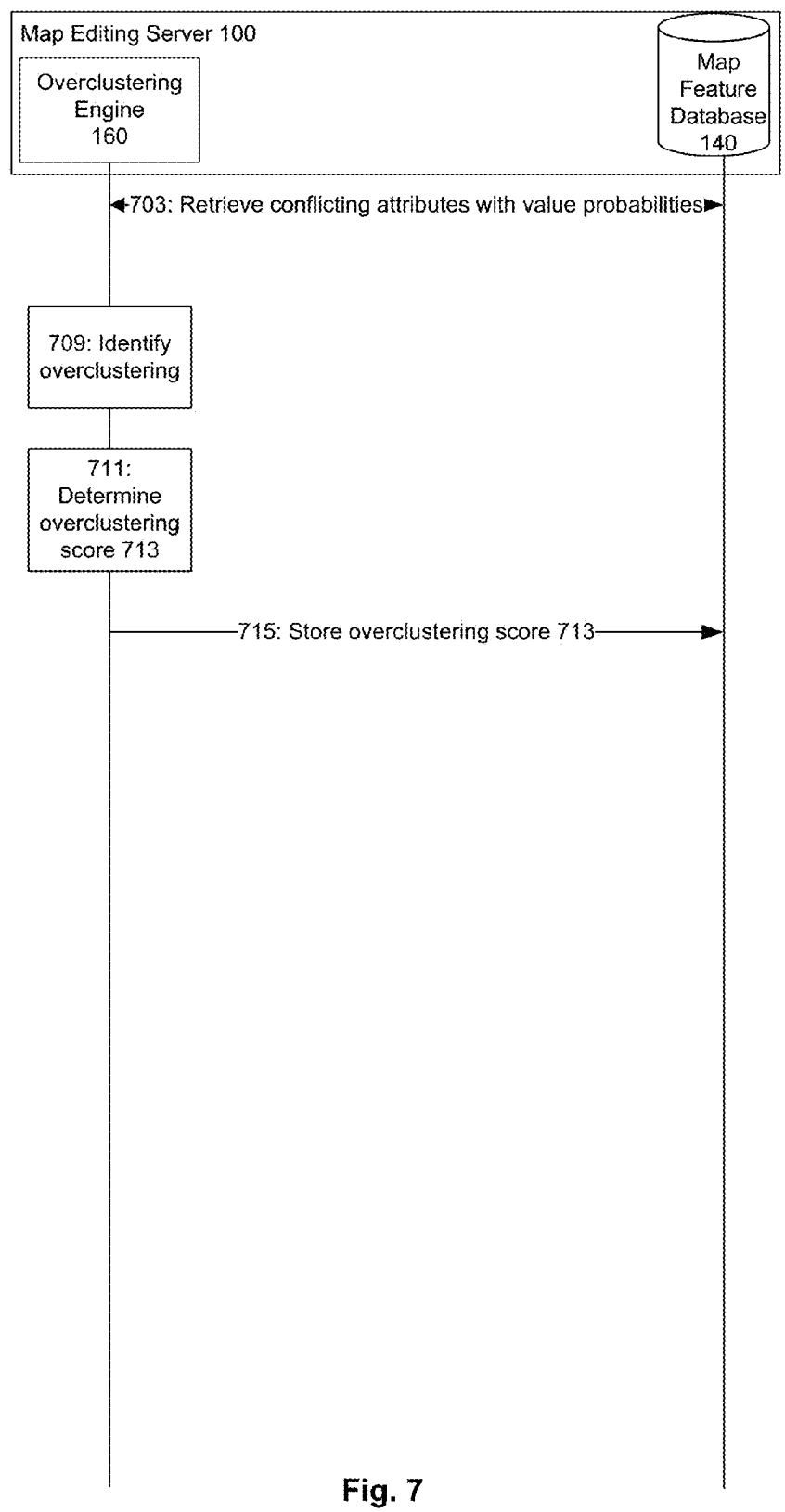
FIG. 7 is a data flow chart illustrating the operation of the overclustering engine according to one embodiment.

The operation of the overclustering engine 160 is described in reference FIG. 7. Overclustering can be detected while map feature records are being created as well as in database of existing database of map feature records. When map feature records are being created, multiple sources of information about map features are frequently consulted. For example, multiple lists of businesses might be purchased. In processing the lists, an attempt is made to identify businesses that appear in both databases and those records are merged. At this point, improper de-duplication can occur. This is especially likely when there are two businesses that share several attributes. For example, there may be a restaurant located inside a hotel. That restaurant is a separate business with its own opening hours, telephone number, etc but it shares the street address of the hotel. The records for the hotel and the restaurant might be incorrectly merged into a single map feature record while processing map feature records from multiple sources. Thus analyzing newly created map feature records for overclustering is useful.

Overclustering may however become evident when the overclustered map feature record is published to the online map hosting system and users propose edits to the map feature. In the example of the hotel and restaurant at the same address, it's possible that the only business present in the map feature records of the online map hosting system 130 is that for the hotel. Users may propose the phone number for the restaurant inside the hotel as a replacement for or in addition to the hotel's phone number for the hotel map feature. Users may also propose to change the title of the map feature from the hotel name to the restaurant name.

The overclustering engine 160 retrieves 703 map feature records from the map feature database 140 along with the edit correctness 605 for the values of the attributes of the map feature. The overclustering engine 160 identifies 709 map feature records having characteristics indicative of overclustering. These characteristics are identified by training the overclustering engine 160 with a training data set of records manually identified as overclustered. The characteristics indicative of overclustering include multiple values for more than one of the map feature attributes where each of the values was approved because its edit correctness 605 exceeded the threshold for approving the edit. For example, in reference to the hotel and restaurant example, a map feature record with multiple phone numbers (for example, the main number for the hotel, a reservations number for the hotel, a number for the restaurant) and multiple titles (Bell Tower Hotel and Escoffier Restaurant) would be indicative of overclustering. In one embodiment, any map feature with more than one title wherein the more than one titles have edit correctness scores 605 that exceed the threshold for being accepted are flagged for manual review. When analyzing titles that are both accepted, the system first removes common words from the title like "Inc." and its variant, "Incorporated." This way Bell Tower Hotel and Bell Tower Hotel, Inc. are not flagged as overclustered. Similarly, Bell Tower Hotel, Inc. and Bell Tower Hotel Incorporated are not flagged as overclustered.

For the map features flagged as overclustered an overclustering score 713 is determined 711. The overclustering score 713 is based on additional map feature attributes that have multiple values, such as a telephone number. The scoring is based on the model determined by the machine learning of the training data set of overclustered map feature records. The more map feature attributes that have multiple values, the higher the overclustering score 713 for the flagged map feature. Certain attributes contribute more to the overclustering score 713. For example, having multiple phone numbers that are reservation phone numbers is more likely to be overclustered than having multiple unclassified phone numbers. This prioritizes the flagged map features for the manual reviewers such that those most likely to be overclustered will be reviewed first. The overclustering score 713 is stored in the map feature database 140.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A method performed on a computer for identifying a map feature record representing more than one map feature comprising:
    receiving a record for a map feature of an online geographic map, the map feature having attributes wherein at least one of the attributes has more than one value;
    determining a first score for each of the more than one values; and
    responsive to each of the first scores exceeding a threshold, identifying the record as possibly representing more than one map feature.

2. The method of claim 1 wherein the at least one of the attributes is a title of the map feature.

3. The method of claim 1 wherein each of the more than one values is proposed by a user and determining the first score comprises:
    determining for the user a second score indicative of a probability that the user provides unreliable values;
    determining for the user a third score indicative of a probability that the user provides accurate values;
    determining a fourth score indicative of a probability that the proposed value is an unreliable value; and
    determining the first score based on the second, third and fourth scores.

4. The method of claim 3 wherein determining the second score comprises:
    receiving a plurality of interactions of the user with a map editing service;
    determining characteristics of the plurality of interactions of the user; and
    determining the second score based at least in part on the determined characteristics of the plurality of interactions.

5. The method of claim 3 wherein determining the second score comprises:
    receiving a plurality of proposed edits to a map feature;
    determining characteristics of the plurality of proposed edits; and
    determining the second score based at least in part on the determined characteristics of the plurality of proposed edits.

6. A system for identifying map feature records representing more than one map feature, the system implemented on one or more processors and comprising:
    a module configured to:
        receive a record for a map feature of an online geographic map, the map feature having attributes wherein at least one of the attributes has more than one value;
        determine a first score for each of the more than one values; and
        responsive to each of the first scores exceeding a threshold, identify the record as possibly representing more than one map feature.

7. The system of claim 6 wherein the at least one of the attributes is a title of the map feature.

8. The system of claim 6 wherein each of the more than one values is proposed by a user and the module configure to determine the first score comprises the module configured to:
    determine for the user a second score indicative of a probability that the user provides unreliable values;
    determine for the user a third score indicative of a probability that the user provides accurate values;
    determine a fourth score indicative of a probability that the proposed value is an unreliable value; and
    determine the first score based on the second, third and fourth scores.

9. The system of claim 8 wherein the module configured to determine the second score comprises a second module configured to receive a plurality of interactions of the user with a map editing service and the module further configured to;

determine characteristics of the plurality of interactions of the user; and determine the second score based at least in part on the determined characteristics of the plurality of interactions.

10. The system of claim 9 wherein the second module configured to receive a plurality of interactions comprises the second module configured to retrieve the plurality of interactions.

11. The system of claim 8 wherein the module configured to determine the second score comprises a second module configured to receive a plurality of proposed edits to a map feature and the module further configured to:

determine characteristics of the plurality of proposed edits; and determine the second score based at least in part on the determined characteristics of the plurality of proposed edits.

12. The system of claim 11 wherein the second module configured to receive a plurality of interactions comprises the second module configured to retrieve the plurality of interactions.

13. A method performed on a computer for identifying a map feature record representing more than one map feature comprising:

receiving a record for a map feature, the map feature having attributes wherein at least one of the attributes has more than one value;

determining a first score for each of the more than one value, wherein each of the more than one values is proposed by a user and determining the first score comprises receiving a plurality of proposed edits to a map feature;

determining characteristics of the plurality of proposed edits; and determining a second score indicative of a probability that the user provides unreliable values based at least in part on the determined characteristics of the plurality of proposed edits;

determining for the user a third score indicative of a probability that the user provides accurate values, determining a fourth score indicative of a probability that the proposed value is an unreliable value, and determining the first score based on the second, third and fourth scores; and responsive to each of the first scores exceeding a threshold, identifying the record as possibly representing more than one map feature.

14. The method of claim 13 wherein determining the second score further comprises:

receiving a plurality of interactions of the user with a map editing service;

determining characteristics of the plurality of interactions of the user; and determining the second score based at least in part on the determined characteristics of the plurality of interactions.

15. The method of claim 13 wherein the at least one of the attributes is a title of the map feature.

16. The method of claim 13 wherein the map feature is of an online geographic map.

17. The method of claim 13 wherein the first score is indicative of the probability that the value is correct.

18. The method of claim 13 wherein the threshold depends on a prominence of the map feature.

19. The method of claim 13 wherein the threshold depends on a number of impressions associated with the map feature.

20. The method of claim 13 wherein at least one of the attributes is a telephone number.

* * * * *